United States Patent [19]

Rounion et al.

[11] Patent Number: 4,490,722
[45] Date of Patent: Dec. 25, 1984

[54] RADIO NAVIGATION SYSTEM

[75] Inventors: William A. Rounion, Tabb; Phillip R. Modlin, Hampton, both of Va.

[73] Assignee: Teledyne Industries, Inc., Los Angeles, Calif.

[21] Appl. No.: 370,070

[22] Filed: Apr. 20, 1982

[51] Int. Cl.³ .............................................. G01S 1/36
[52] U.S. Cl. .................................................. 343/394
[58] Field of Search ............... 343/394, 395, 393, 386, 343/387, 388, 396

[56] References Cited

U.S. PATENT DOCUMENTS

| | | | |
|---|---|---|---|
| 2,709,253 | 5/1955 | Haywood et al. | 343/394 X |
| 2,779,018 | 1/1957 | Gregoire et al. | 343/394 X |
| 2,838,753 | 6/1958 | O'Brien et al. | 343/393 |
| 3,241,139 | 3/1966 | Wajley | 343/394 X |
| 3,325,811 | 6/1967 | Earp | 343/394 |
| 3,333,265 | 7/1967 | Rounion . | |
| 3,613,095 | 10/1971 | Elwood | 343/387 X |
| 3,787,844 | 1/1974 | Hastings et al. . | |
| 4,308,620 | 12/1981 | Grousseau | 343/386 X |

*Primary Examiner*—Theodore M. Blum
*Assistant Examiner*—Gilberto Barrón, Jr.
*Attorney, Agent, or Firm*—Cushman, Darby & Cushman

[57] ABSTRACT

An improved line-of-position radio navigation system is disclosed wherein a continuous wave signal produced by a local oscillator is transmitted from a fixed station. At a remote mobile station, the signal is received and is heterodyned with the output of a local oscillator at the mobile station to produce a signal having an audio frequency. The output of the mobile station's local oscillator also is synthesized to produce an audio frequency signal which is phase-compared with the audio heterodyne signal by a phase meter to generate line-of-position information. To adjust for any drift in the local oscillators, a transmitter at the mobile station is periodically activated for a brief interval to cause heterodyning at the fixed station. The resultant signal is employed to transmit a modulated signal from the fixed station which is processed at the mobile station to perform a phase adjustment to compensate for oscillator drift.

3 Claims, 3 Drawing Figures

RADIO NAVIGATION SYSTEM

BACKGROUND OF THE INVENTION

The rapidly increasing number of large, deep draft vessels, many of them carrying potentially dangerous and/or polluting-type cargos through poorly charted waters, has called attention to a severe lack of detailed precision hydrography in many areas of the world. The problem is especially acute in the coastal waters of some of the developing countries where new ports are opening almost daily in areas where detailed, reliable hydrographic data is either nonexistent or inadequate. With all the modern navigation methods available to today's seagoing skipper, such as SATNAV, precision radar, LORAN-C, Differential Omega and the like, there should be little doubt about the position of one's own vessel. However, accurate and detailed charts of the area are just as important to the completion of a safe passage as is accurate knowledge of a vessel's position. It is of little benefit to know precisely the position of one's own ship unless one also knows, with equal precision, the location of the channels, bars, shoals, and other navigational hazards in the areas. Hence, the rapidly developing demand for an enormous amount of detailed, accurate hydrography, which must be produced and published as rapidly as possible. At the same time, the rapidly escalating cost of hydrographic operations means that this expanding workload must be carried out using the most efficient and cost-effective methods available. This is, of course, the motivation behind the development of higher speed hydrographic vessels, more precise echo sounders, multiple transducer arrays and the experimental airborne hydrographic systems using infrared and laser systems.

One of the most important factors in the performance of accurate hydrographic surveying is the positional reference system by means of which the hydrographic data is referenced to the geodetic earth. In most cases today, the positional reference system will be one of several radiopositioning systems each of which has its own set of individual characteristics and capabilities. The criteria for an acceptable radiopositioning system include: a precision of better than ±5 meters; long range to cover coastal shelf areas: high reliability and freedom from down time; low cost; simplicity of operation; a minimum number of radio frequencies; the capability of supporting a large number of simultaneous users; and unambiguous identification and confirmation of position.

SUMMARY OF THE INVENTION

The present invention achieves the foregoing criteria with a system which employs a continuous wave, phase comparison technique utilizing audio heterodynes generated by continuous wave (cw) transmitters operating in the MF or HF frequency bands. More particularly, a fixed station is provided with a cw transmitter which propagates a cw signal generated by a first local oscillator. This signal is picked up by a receiver at a mobile station where it is mixed with a signal generated by a local oscillator at the mobile station to produce an audio heterodyne which is supplied as one input to a phase meter. The output of the second oscillator also is synthesized to produce an audio frequency which is passed through a phase shifter to serve as a second input of the phase shifter. The phase difference measured by the meter provides line-of-position (LOP) information for the mobile station. To compensate for drift in the local oscillators, periodically for a brief interval a transmitter at the mobile station is activated to transmit the frequency produced by the second local oscillator to a receiver at the fixed station which produces an audio heterodyne established by the difference between the frequencies of the respective local oscillators. This heterodyne modulates the carrier of the fixed station's transmitter, and the transmitter propagates the lower sideband of the modulated signal simultaneously with the continuous wave. At the mobile station, the receiver produces an audio heterodyne signal on receipt of the lower sideband and the output of the second local oscillator. This signal is applied to the phase shifter where it is compared with the local oscillator's frequency so as to produce a phase shift reflecting the relative drift of the two local oscillators during the period prior to activation of the mobile station's transmitter. By such an arrangement, the system is periodically updated so that its LOP measurements remain reliable.

The invention will be described in further detail with respect to the accompanying drawings wherein.

DETAILED DESCRIPTION OF THE INVENTION

Figure 1:
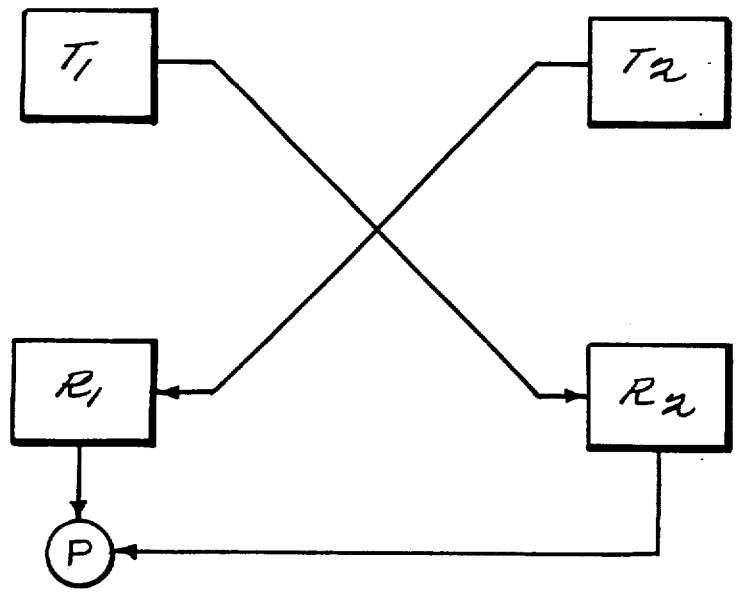
FIG. 1 is a block diagram of the basic elements of an iso-phase navigation system known in the prior art.

Referring first to FIG. 1 of the drawings, there is illustrated the basic elements of a known iso-phase navigation system of the type described in U.S. Pat. No. 3,333,265, which issued on Jul. 25, 1967. These elements are typically arranged such that a transmitter $T_1$, a receiver $R_1$ and a phase meter P are located aboard a mobile unit, such as a ship, whose position is being determined, while the transmitter $T_2$ and receiver $R_2$ are positioned at a fixed location.

The two transmitters $T_1$ and $T_2$ are free running continuous wave (cw) transmitters, continuously transmitting and not keyed or synchronized in any way. The carriers of these two transmitters are slightly different in frequency so that they form an audio heterodyne tone, or beat note, as the carriers are continuously received in each of the two receivers, $R_1$ and $R_2$. The frequency of the heterodyne tone is unimportant, but typically it is in the 200 to 500 Hz range. The two resulting heterodyne tones, from $R_1$ and $R_2$, are brought together at the phase meter P where the relative phases therebetween are measured. As long as the distance between the receivers and transmitters remains constant, the phase difference measured at P will remain constant, but as soon as either transmitter (or receiver) moves with respect to the other, the relative phase measured by P will change. By constantly measuring this change of phase, the distance between the transmitter-receiver pairs can be very accurately followed.

The arrangement shown in FIG. 1 is sufficient to permit tracking a mobile unit in only one dimension giving what is known as a single line-of-position (LOP). To obtain a "position fix" a minimum of at least two LOP's must be generated by using additional receivers, transmitters and phase meters.

With apparatus of the type just described, variations in the manner in which the five basic elements are grouped and the selection of which grouping is to be made mobile with the others remaining stationary, determines whether the LOP pattern will be hyperbolic, elliptical, or circular, and whether the mobile unit will operate "passively" (receiving only), or "actively" (transmitting).

Figure 2:
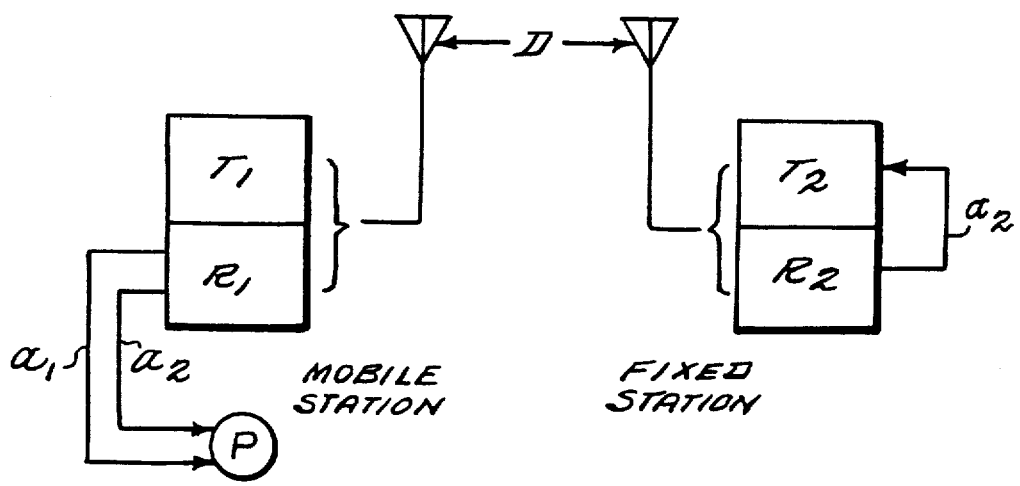
FIG. 2 is a block diagram of the basic elements of a further iso-phase navigation system known in the prior art.

In the prior art arrangement disclosed in U.S. Pat. No. 3,787,844, which issued on Jan. 22, 1974, the five basic elements of FIG. 1 are grouped as shown in FIG. 2. The audio heterodyne developed in receiver $R_2$ is returned to the mobile unit in the form of a sideband on the continuous transmission of transmitter $T_2$. At the mobile unit, receiver $R_1$ develops its own audio heterodyne $a_1$ and also detects the heterodyne $a_2$ being returned from the fixed station. It then sends both heterodynes to the phase meter P for phase-comparison. It can be confirmed mathematically that as the distance D between the two antennas changes by one-half the wavelength of the frequency of $T_2$, the phase meter P will register a change in relative phase between the two heterodynes of exactly 360°.

Of course, the arrangement described provides only one LOP and a second LOP, necessary for producing a "position fix", is generated in exactly the same way using a second fixed base station package consisting of a receiver and transmitter identical to the fixed station but adjusted to produce a heterodyne tone a few Hz different from that generated by $T_2$. Typically, the two heterodyne tones in such a system are 370 Hz and 450 Hz.

Additional "mobile" units can be operated using the same pair of fixed base stations provided the continuous wave transmitters of the several mobile units are tuned to slightly different frequencies so that a different pair of audio heterodyne tones are generated by each mobile unit. Each mobile unit then obtains its position data by making its phase-comparisons only on its own unique pair of heterodyne tones.

If transmitters $T_1$ and $T_2$ in the system shown in FIG. 2 were controlled by perfectly synchronized oscillators, not subject to relative frequency drift, and therefore perfectly phase-stable over long periods of time, transmitter $T_1$ and receiver $R_2$ would not be necessary. In such a case, the $T_1$ oscillator could be introduced directly into a mixer along with the signal from a reference oscillator to produce an audio heterodyne tone. This tone, together with the audio heterodyne produced at the fixed station, could then be introduced into the phase meter P, just as before, and the relative phase measured by P would again be a measure of the distance D except that now the phase meter P would register a 360° change in the relative phase between the two heterodyne tones when the distance D increased or decreased by a full wavelength of the frequency of transmitter $T_2$, instead of by a half wavelength change, as in the FIG. 2 system.

Even with the advent of highly stable atomic oscillators, the arrangement just described is not possible inasmuch as such oscillators cannot remain perfectly synchronized for long periods of time. When used in radiopositioning systems heretofore, some method has been necessary either to keep the atomic oscillators synchronized or to periodically measure frequency drift and make adjustments therefor. The present invention provides a novel arrangement of utilizing atomic oscillators to produce an improved version of the radiopositioning system described with respect to U.S. Pat. No. 3,787,844.

Figure 3:
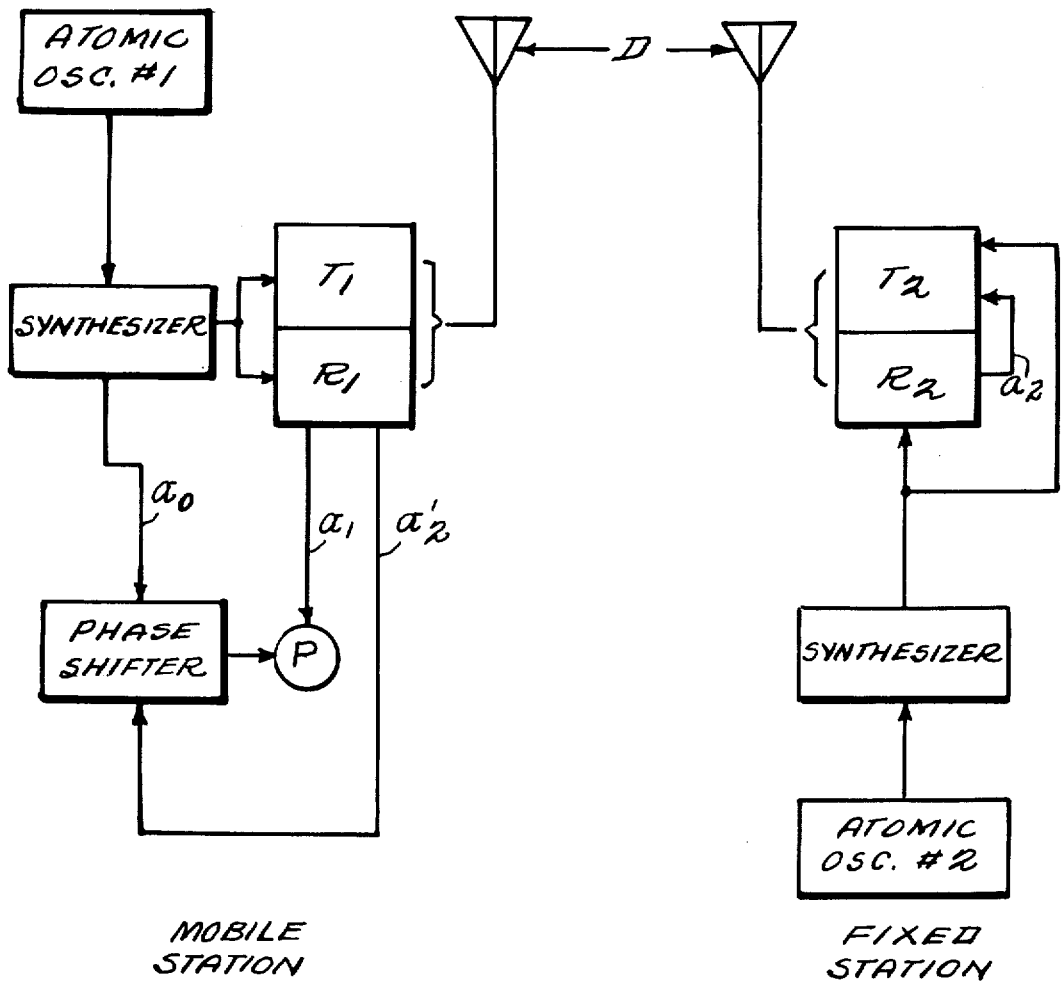
FIG. 3 is a block diagram of the basic elements of an improved iso-phase navigation system according to the present invention.

Referring to FIG. 3 of the drawings, a system is disclosed employing atomic oscillators which obviate the requirement of those systems described with respect to FIGS. 1 and 2 that there be continuous wave transmission from each station to the other(s) and that there be synchronism between the oscillators. More particularly, the FIG. 3 arrangement provides atomic oscillators #1 and #2 at the mobile and fixed stations, respectively. The frequencies of these oscillators differ by an audio amount. Accordingly, when the frequency of oscillator #1 is mixed in receiver $R_1$ with that of oscillator #2 which has been transmitted from $T_2$ at the fixed station, an audio frequency heterodyne $a_1$ results. A synthesizer is provided at the mobile station to direct the output of oscillator #1 to $R_1$ and to also produce an audio frequency $a_o$ which serves as a reference against which the phase of $a_1$ can be measured. For reasons which will be explained hereinafter, the frequency of $a_o$ is twice that of $a_1$. Accordingly, in order to permit phase meter P to measure the phase difference between $a_o$ and $a_1$, the latter is directed through a multiplier which doubles its frequency prior to $a_1$ being applied to the phase meter.

As long as the frequencies (and thus the relative phase) of the oscillators do not change and the distance D between the fixed and mobile stations remain the same, the phase meter P will measure a constant phase relationship between $a_o$ and $a_1$. However, because the oscillators actually will drift apart over the passage of time, means are provided to periodically update the system to adjust for such deviations by occasionally employing the transmitter $T_1$ and receiver $R_2$ to establish a brief communication link from the mobile station to the fixed station.

More particularly, during an update period, $T_1$ transmits the continuous output of oscillator #1 (e.g. 1754.2 kHz) which is received at the fixed station by $R_2$ where it is beat against the continuous output of oscillator #2 (e.g. 1753.7 kHz) to produce an audio heterodyne $a_2$ (0.5 kHz). The transmitter $T_2$ of the fixed station continuously transmits the output of oscillator #2 (e.g. 1753.7 kHz). Additionally, during the update period, $a_2$ is applied to the transmitter via conventional phase lock loop circuitry so as to cause the transmitter to also transmit the lower sideband of the oscillator #2 frequency, as modulated by $a_2$ (i.e. 1753.2 kHz). At the mobile station, $R_1$ receives both signals transmitted by $T_2$ during the update period. The audio heterodyne $a_1$ is produced as previously described, and a further audio frequency $a'_2$ is generated having a frequency which is 1.0 kHz, the difference between that of oscillator #1 (1754.2 kHz) and the frequency of the lower sideband transmitted by $T_2$ (1753.2 kHz). Both the synthesized 1.0 kHz output $a_o$ of oscillator #1 and the 1.0 kHz output $a'_2$ of $R_1$ occurring during update are applied to a phase shifter interposed between the synthesizer and the phase meter P. The phase shifter responds to any change in the relative phase of $a_o$ and $a'_2$ which may have occurred from one update period to the next to correspondingly adjust the phase of $a_o$ as it is applied to the phase meter P. Accordingly, the system compensates for any oscillator drift which may occur between updates.

Although the system just described provides only a single line-of-position (LOP) measurement for a single mobile station, it is apparent that the system is readily expandable to multiple LOP measurements by employing additional fixed stations each having an identifiable continuous wave transmission frequency with which the mobile station(s) can achieve the same sort of frequency relationship as the exemplary one described above with respect to FIG. 3. In the event that multiple mobile stations are employed, each such station is assigned an update time slot so that no two mobile units will be updating at the same time.

The inclusion of a dual-frequency arrangement on the mobile station permits that station to progress along a coastline dropping communication with a fixed station as it moves out of range and picking up communication with another fixed station coming into range.

Since each mobile station is continuously receiving a phase-comparing signal from fixed base stations all of the time, i.e., both during and between update periods, the system produces line-of-position information all of the time rather than incrementally. Consequently, the system has an unlimited velocity and acceleration tracking capability.

Since the arrangement described with respect to FIG. 3 is essentially a single frequency system which can be operated on any frequency in the MF or HF bands, the invention is particularly suitable for use in areas where national or regional frequency allocation is restricted so as to limit the utilization of the multiple frequency systems of the prior art.

The atomic oscillators employed with the invention need only be sufficiently stable to maintain acceptable positional accuracy between updates. Typically, for an update frequency of once per hour, a rubidium oscillator having a short term oscillator stability of $10^{-12}$ is suitable. Obviously, higher stability oscillators could be employed to permit a longer period between updates.

With a system of the type described, reliability in positional accuracy of approximately ±2 or 3 meters is possible at ranges of up to 400–500 kilometers.

What is claimed is:

1. A line-of-position navigation system for determining the position of a mobile station, comprising:
   a first transmitter located at a fixed station and responsive to a first local oscillator for propagating a continuous wave at a first frequency;
   a second local oscillator and a first receiver located at the mobile station, said second oscillator operating at a second frequency differing from that of the first oscillator by a frequency in the audio range, said receiver being responsive to the continuous wave and the output of the second oscillator to produce a first signal at said audio frequency;
   synthesizer means joined to said second oscillator for producing a second audio frequency signal;
   means including a phase shifter for connecting said second audio frequency signal as a first input to a phase meter;
   means for connecting said first audio frequency signal as a second input to the phase meter, said meter being operative to provide line-of-position information in response to the phase relationship between said first and second audio frequency signals;
   a second transmitter located at said mobile station;
   means for intermittently operating said second transmitter to propagate a signal at the frequency of said second oscillator;
   a second receiver located at said fixed station, said receiver being responsive to receipt of the output of said first oscillator and the signal propagated by the second transmitter to produce an audio frequency signal;
   means for connecting said audio frequency signal produced by the second receiver to said first transmitter to produce a modulated signal having a carrier at the frequency of said first oscillator, said transmitter being operative to propagate, together with said continuous wave, a sideband of the modulated signal, said receiver means at the mobile station being responsive to said sideband to produce a third audio frequency signal at said mobile station;
   means for connecting said third audio frequency signal to said phase shifter, said phase shifter being operative during the intermittent periods of operation of the second transmitter to compare the phase relationships of said second and third audio frequency signals and to adjust the phase of the first input to the phase meter in response to any change in phase relationship occurring between said periods.

2. A system as set forth in claim 1 wherein:
   the frequency of said second audio frequency signal is a multiple of that of the first audio frequency signal;
   said means for connecting the first audio frequency signal to the phase meter includes a multiplier for multiplying the frequency of the first audio frequency signal to equal that of the second audio frequency signal;
   the second oscillator operates at a frequency higher than the first oscillator by an amount equal to the frequency of the first audio frequency signal;
   the frequency of the audio frequency signal produced at the fixed station equals that of the first audio frequency signal;
   the first transmitter during said intermittent periods propagates a lower sideband of said modulated signal; and
   the frequency of the third audio frequency signal equals that of the second audio frequency signal.

3. A system as set forth in either of claims 1 or 2 wherein said oscillators are of the atomic type.

* * * * *